United States Patent
Coscarella et al.

(10) Patent No.: US 6,766,437 B1
(45) Date of Patent: Jul. 20, 2004

(54) COMPOSITE UNIPROCESSOR

(75) Inventors: Anthony S. Coscarella, Brookfield, CT (US); Joseph L. Temple, III, Hurley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/514,630

(22) Filed: Feb. 28, 2000

(51) Int. Cl.$^7$ ............... G06F 15/80; G06F 9/30; G06F 15/82
(52) U.S. Cl. ............... 712/20; 712/21; 712/22; 712/43; 712/229; 712/25
(58) Field of Search .................. 712/24, 212, 210, 712/215, 219, 227, 235, 245, 20, 21, 22, 23, 41, 43, 25, 229; 709/106, 400

(56) References Cited

U.S. PATENT DOCUMENTS

| | | | |
|---|---|---|---|
| 4,891,787 A | 1/1990 | Gifford | 364/900 |
| 4,901,230 A | 2/1990 | Chen et al. | 364/200 |
| 4,916,652 A | 4/1990 | Schwarz et al. | 364/748 |
| 5,212,777 A | 5/1993 | Gove et al. | 395/375 |
| 5,355,508 A | 10/1994 | Kan | 395/800 |
| 5,408,671 A | 4/1995 | Tanaka | 395/800 |
| 5,475,856 A | * 12/1995 | Kogge | 712/215 |
| 5,524,255 A | 6/1996 | Beard et al. | 395/800 |
| 5,526,487 A | 6/1996 | Schiffleger | 395/821 |
| 5,692,193 A | * 11/1997 | Jagannathan et al. | 709/106 |
| 5,778,221 A | 7/1998 | Temple | 395/591 |
| 5,787,272 A | * 7/1998 | Gupta et al. | 709/400 |
| 5,805,915 A | 9/1998 | Wilkinson et al. | 395/800.2 |
| 5,875,342 A | 2/1999 | Temple | 395/733 |
| 5,937,199 A | 8/1999 | Temple | 395/735 |

* cited by examiner

*Primary Examiner*—Daniel H. Pan
(74) *Attorney, Agent, or Firm*—Floyd Gonzalez, Esq.; Marc A. Ehrlich, Esq.; Heslin Rothenberg Farley & Mesiti P.C.

(57) ABSTRACT

Instruction and data registers of processors of a multiprocessing computing system are joined and forked to allow processing in multiple modes of operation. When joined, the registers of the processors each contain a same piece of information, hence generating single instruction and data streams. In contrast, when forked, the registers of the processors contain different pieces of information, thereby generating multiple instruction and data streams. Additionally, information may be stored into partitions of memory and fetched and broadcast by processors local to the particular memory sections thereby resulting in a faster cycle time.

74 Claims, 9 Drawing Sheets fig. 1 fig. 2

| ACR STATE | ADDRESS | TARGET |
|---|---|---|
| 00 | PRIVATE—ALWAYS ADDRESS MEMORY | PRIVATE—ONLY LOAD FROM LOCAL OTHERWISE NOOP |
| 01 | JOINED—ADDRESS MEMORY AND BROADCAST IF LOCAL | JOINED—WAIT FOR BROADCAST IF NOT LOCAL |
| 10,11 | FORCE INTERLEAVE TO LOCAL AND ADDRESS MEMORY | ONLY UPDATE WHEN ADDRESS REGISTER IS JOINED |

*fig. 4A*

ACR STATES

| ACR IC BIT | ACR RB BITS | RB | RT UPDATE (LOAD) | IC UPDATE (BRANCH) |
|---|---|---|---|---|
| 0 | 00 | FORKED, LOCAL ACCESS | LOCAL, ACR →00 | ACR →00 |
| 0 | 01 | JOINED, LOCAL FOR LOAD EID MATCH FOR BRANCH | LOCAL, ACR →00 | BROADCAST, ACR →1 |
| 0 | 10 | JOINED | ERROR | ERROR |
| 0 | 11 | RESERVED | RESERVED | RESERVED |
| 1 | 00 | FORKED, LOCAL ACCESS | LOCAL, ACR →00 | ACR →0 |
| 1 | 01 | JOINED, EID MATCH | BROADCAST ACR →00 | BROADCAST, ACR →1 |
| 1 | 10 | FORCE EID MATCH | LOCAL, ACR →00 | ACR →0 |
| 1 | 11 | RESERVED | RESERVED | RESERVED |

LFA INSTRUCTION WILL SET ACR FOR RT TO 10
LJA INSTRUCTION WILL SET ACR FOR RT TO 01
BAB AND LJA CAUSE BROADCASTS FROM EID = 0
BAB WILL SET THE ACR BIT FOR THE IC TO 1 fig. 4B fig. 5 fig. 6 fig. 7A fig. 7B

COMPOSITE UNIPROCESSOR

CROSS-REFERENCE TO RELATED APPLICATION

This patent application is related to commonly assigned, co-filed patent application Ser. No. 09/514,435, by Starke et alt. entitled "Register Pipe For Multi-Processing Engine Environment," which is hereby incorporated herein by reference in its entirety.

TECHNICAL FIELD

This invention relates, in general, to multiprocessor computing systems and, more particularly, to a multiprocessor computing system capable of operating in a uniprocessor mode as well as in a parallel processing mode.

BACKGROUND ART

Generally speaking, computer programs may be executed by computing systems in various modes. For instance, any of a single instruction stream single data stream (SISD) mode; a single instruction stream multiple data stream (SIMD) mode; a single program multiple data stream (SPMD) mode; or a multiple instruction stream multiple data stream (MIMD) mode may be used to execute a typical computer program.

In SISD mode, a computer program generates and executes a single instruction stream to produce a single data stream or result. This is commonly referred to as a classical uniprocessor mode of operation. In addition, operation in a SISD mode often occurs even in multiprocessor or parallel systems. This may occur due to programming techniques, algorithmic serialization, or legacy from past implementations.

In many multiple processor or multiprocessor systems, computer programs may be executed in SIMD mode. In this mode, several pieces of data are simultaneously processed by a single instruction. Thus, several processors or processing elements may operate on a same instruction but with separate data-streams. In the SPMD variant of this mode, each processor executes a same program, which is fetched independently, and operates on its own data stream. Operation in SPMD mode allows the various processors to be attached only to local memory and communicate results over a message passing fabric or network.

In other multiprocessor systems, programs may be executed in a MIMD mode where each processor operates independently not only on its own data streams, but also on its own instruction streams. Processing in this mode is facilitated by either shared storage or by passing messages between the processors.

Classical multiprocessors, or shared memory processors (SMPs), allow programs to be executed in either SISD or MIMD modes, and sometimes in SPMD mode. However, these machines suffer from memory contention constraints. Because of this, the granularity of parallelism is usually limited to a level at which it is beneficial to execute several program-managed threads or processes which communicate by sharing memory, or by passing internal messages.

As such, it is desirable to exploit a finer grain of parallelism where single threads use several processors for short-lived bursts of parallel processing in conjunction with periods of intervening serial processing which exploit the higher memory bandwidth and the larger cache space provided by multiple processors. To meet this end, it is necessary to provide a computing system capable of switching between the various desired modes of operation. In addition, it is desirable to provide a computing system capable of such versatile operation without significant delay or without explicit programming through, for example, the use of special switch instructions. Further, the provision of a higher memory bandwidth and larger, faster cache is also desirable to facilitate efficient operation in SISD mode.

SUMMARY OF THE INVENTION

The shortcomings of the prior art are overcome and additional advantages are provided through the provision of a technique for operating a computing system which relies on joining and forking,registers. By doing so, the technique of the present invention advantageously allows the processors of a computing system to rapidly and efficiently switch between the generation of single instruction and data streams and the generation of multiple instruction and data streams. As a result, the computing system of the present invention is capable of switching between multiple modes of operation. In addition, a higher memory bandwidth and a larger, faster cache is provided through the partitioning of memory and the fetching and broadcasting of information by a processor local to a particular section.

In one embodiment of the invention, a method of operating a computing system, wherein the computing system includes a plurality of processors with each processor having at least one instruction register, is provided. The method includes operating the plurality of processors in a multiple instruction mode, wherein the instruction registers generate separate instruction streams; and joining the instruction registers to switch operation of the plurality of processors to a single instruction mode, wherein the instruction registers generate a single instruction stream.

In another embodiment of the invention, a system for operating a computing system, wherein the computing system includes a plurality of processors with each processor having at least one instruction register is provided. The system includes means for operating the plurality of processors in a multiple instruction mode, wherein the instruction registers generate separate instruction streams; and means for joining the instruction registers to switch operation of the plurality of processors to a single instruction mode, wherein the instruction registers generate a single instruction stream.

In yet another embodiment of the invention, an article of manufacture including a computer useable medium having computer readable program code means embodied therein for operating a computing system, wherein the computing system includes a plurality of processors with each processor having at least one instruction register is provided. The computer readable program code means in the article of manufacture includes computer readable program code means for operating the plurality of processors in a multiple instruction mode, wherein the instruction registers generate separate instruction streams; and computer readable program code means for joining said instruction registers to switch operation of the plurality of processors to a single instruction mode, wherein the instruction registers generate a single instruction stream.

In an enhanced embodiment of the present invention the computing system includes a plurality of memory units with each memory unit being local to one processor and being remote to the remaining processors. This embodiment further includes fetching, when in the single instruction mode, an instruction stored in a memory unit by one processor which is local to the memory unit and broadcasting the instruction to the remaining processors which are not local to the memory unit; and fetching and not broadcasting, when in the multiple instruction mode, an instruction by each processor from its local memory unit.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with the principles of the present invention, a technique for operating a computing system by relying on joining and forking registers is provided. By doing so, the technique of the present invention advantageously allows the processors of a computing system to contain a same piece of information, when the registers are joined, and different pieces of information, when the registers are forked. Consequently, the computing system may rapidly and efficiently switch between multiple modes of operation. In addition, the present invention also provides for a higher memory bandwidth and a larger, faster cache through the partitioning of memory and through the fetching and broadcasting of.information by a processor local to a particular section.

Figure 1:
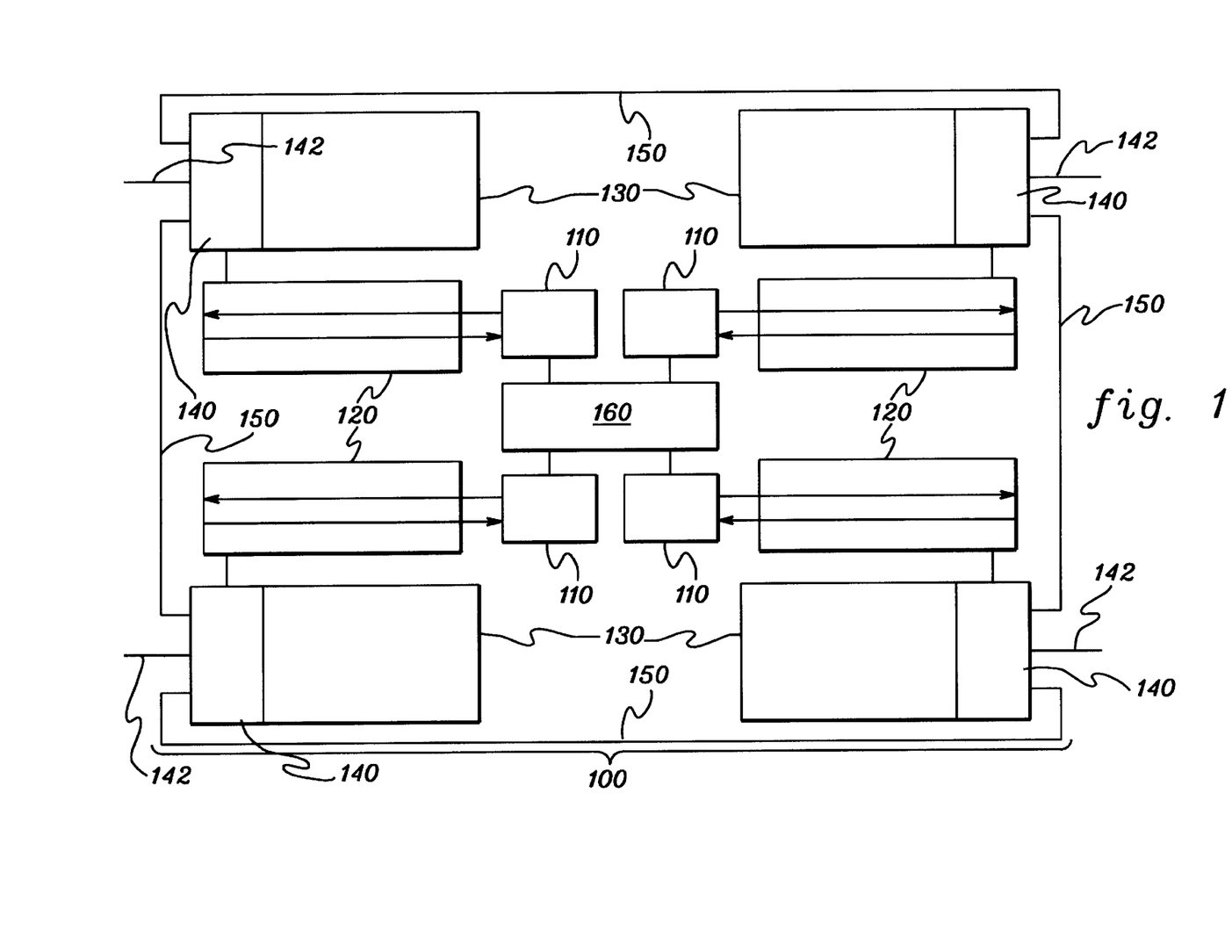
FIG. 1 depicts one example of a computing system capable of operating in a uniprocessor mode and in a parallel processing mode, in accordance with the principles of the present invention.

In accordance with the principles of the present invention FIG. 1 depicts a multiprocessor computer system 100 capable of operating alternatively as a uniprocessor (i.e., generating a,single instruction and data stream) and as a parallel processor (i.e, generating multiple instruction and data streams). In one embodiment, computing system 100 includes a plurality of processors or engines 110 (i.e., processors 00, 01, 10, and 11), with each processor having associated therewith and connected thereto an L1 cache 120.

In this particular embodiment, computing system 100 is shown as being located on a single chip. However, other embodiments with components located on multiple chips are possible without departing from the principles of the invention.

L1 caches 120 connect processors 110 to L2 caches 130 via memory interfaces 140. Memory interfaces 140, in turn, are also connected to main memory (not shown) via buses 142. In addition to being connected to their own processors 110, the L2 caches 130 may also be interconnected to one another via a plurality of bidirectional buses 150 thereby allowing the L2 caches to operate as a single unit having a relatively large amount of L2 cache memory. However, in addition to operating as a single L2 cache, L2 caches 130 are also partitioned (into the four units shown in FIG. 1) so that each processor 110 may be associated with a particular portion of the combined L2 cache. This allows rapid access to any location in the L2 cache memory and results in a faster cycle time. In addition to being connected to their own L1 cache, processors 110 are also interconnected with one another via an interconnection system 160 which is described in detail below.

Figure 2:
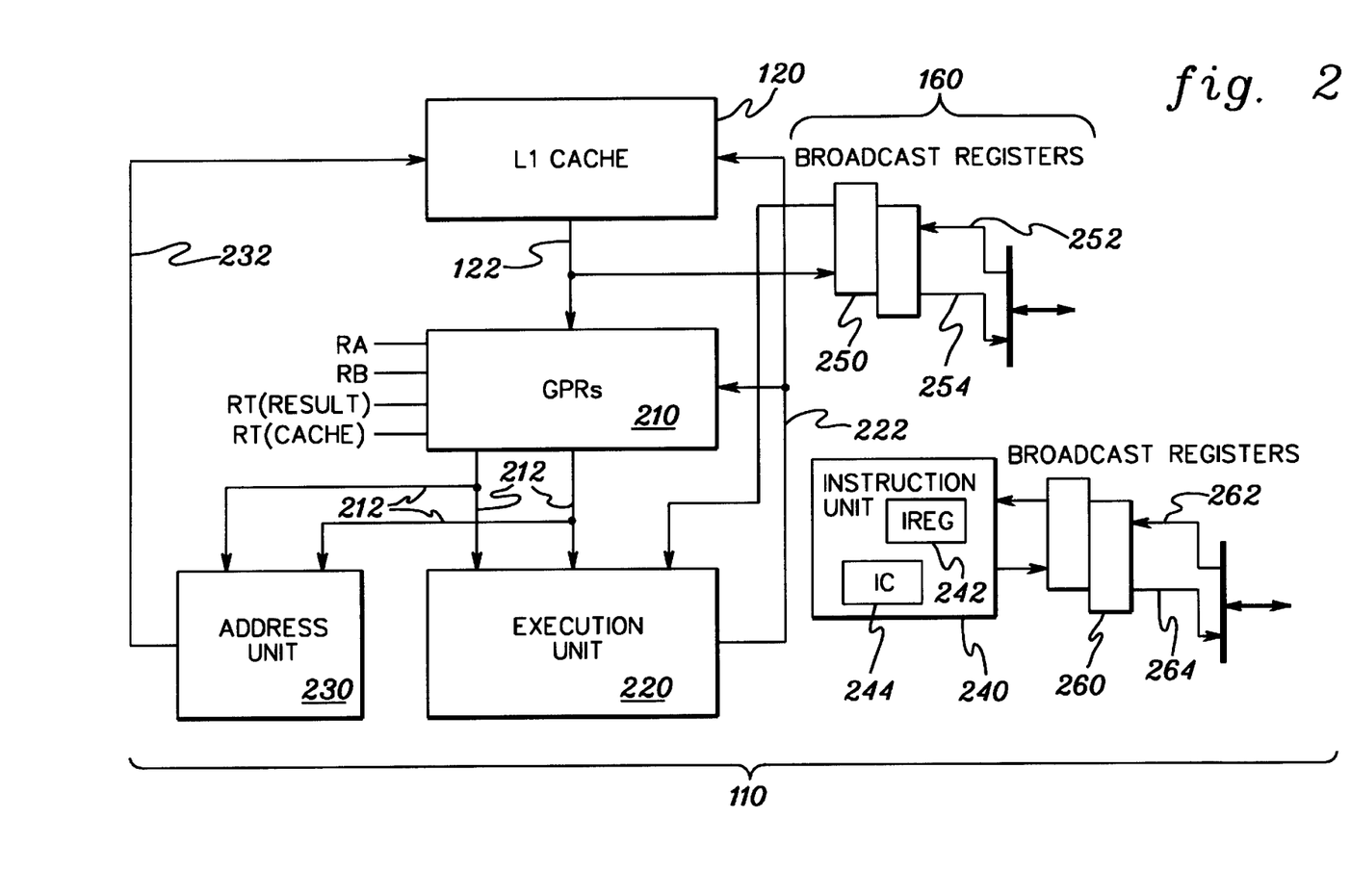
FIG. 2 depicts one example of a portion of the computing system of FIG. 1, in accordance with the principles of the present invention.

FIG. 2 depicts one processor 110 and its associated portion of interconnect system 160 as well as with its associated L1 cache 120. Each processor 110 includes a plurality of general purpose registers (GPRs) 210, an execution unit 220, an address unit 230, and an instruction unit 240. In addition, associated with each processor 110 are a plurality of data broadcast registers 250 and a plurality of instruction broadcast registers 260.

As will be evident to one skilled in the art, any number of GPRs 210, for example sixteen, may be included with each processor. Each GPR may be used for a variety of purposes. For example, one or more GPRs may be used as address registers and are designated as such by a RB field of a single address register instruction and as RB and RA fields of a multiple address register instruction. Likewise, for purposes of describing the present invention, the GPRs may be used as target registers (i.e., a destination for data after performing an operation) and are designated as such by a RT field (which in some architectures is the same as a RA) of an instruction which updates registers either upon fetching data from memory (i.e., RT cache) or upon completion of an operation in the execution unit (i.e., RT result). In addition, the contents contained in the GPRs may be used as operands or as addresses. Finally; it should also be noted that there are a wide variety of execution architectures known to those skilled in the art and that an equally wide variety of nomenclatures may be used to describe the various functions of the GPRs.

In accordance with the principles of the present invention, each GPR, of each processor is associated with a corresponding GPR in the other processors. Furthermore, these corresponding GPRs of each processor may be forked or joined, such that, when joined, the associated GPRs contain identical copies of the same data fetched from a single source, and when forked, the GPRs contain separate data fetched individually by a local processor.

Typically speaking, instruction unit 240 includes instruction register 242 and instruction counter (IC) 244. In operation, instructions are fetched from memory according to a location referenced by instruction counter 244. The fetched instructions are then latched to instruction register 242 which then allows its processor to execute the fetched instruction utilizing RB and RA as mentioned above.

L1 cache 120 is arranged so that information may be fetched therefrom and stored to GPRs 210 via bus 122. From there, the information stored in GPRs 210 may be transmitted, via buses 212, to address unit 230 and used in the calculation of an address, or to execution unit 220 where an operation is performed. The result of the address calculation performed in address unit 230 is stored in L1 cache 120 via bus 232. The result of the operation performed in execution unit 220, on the other hand, may be stored back to GPRs 210 or alternatively to L1 cache 120 via bus 222.

In addition to fetching information from L1 cache 120 to store in GPRs 210 or to present as input to execution unit 220, information may also be fetched from broadcast registers 250 via bus 256. As will be explained below, information received in this manner originates from data broadcast registers of other processors via bus 252. Similarly, information stored locally may also be transmitted or broadcast from L1 cache 120 to the other processors by way of data broadcast registers 250 via bus 254. Like the data broadcast registers 250, instruction broadcast registers 260 may also be used to broadcast instructions received locally from instruction unit 240 via bus 264, as well as to receive instructions broadcast by the other processors via bus 262.

Figure 3:
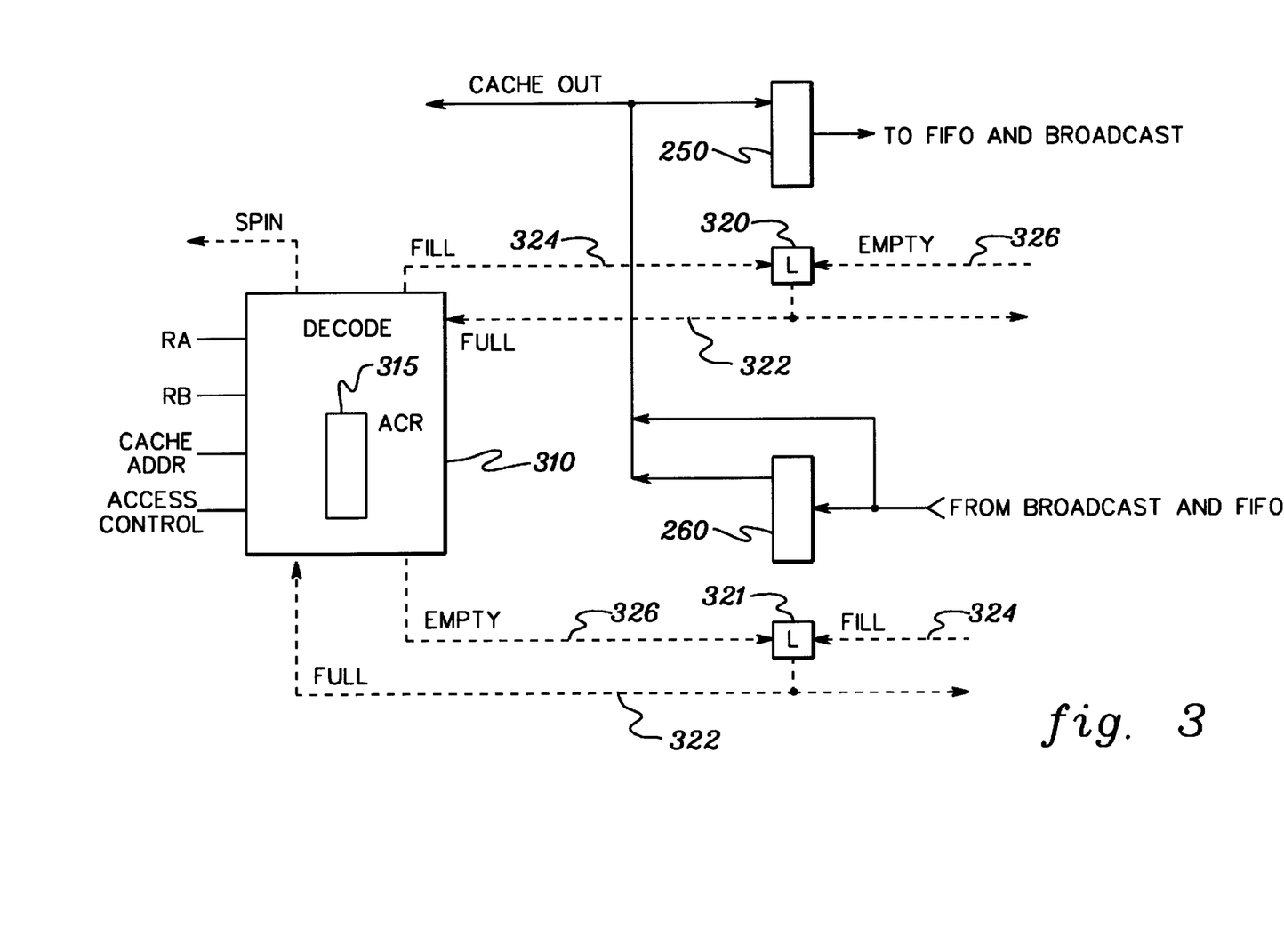
FIG. 3 depicts one example of a portion of a processor depicted in FIGS. 1 and 2, in accordance with the principles.of the present invention.

In accordance with the principles of the present invention, information broadcast from one processor to the other processors is facilitated by the broadcast registers in a first-in, first out (FIFO) manner. Referring to FIG. 3, a portion of a single processor 110 is depicted with a decoder 310 which includes an access control register 315. Decoder 310 is connected to latches 320 and 321 which, as shown in FIG. 3, are respectively associated with broadcast registers 250 and 260.

Latches 320 and 321 indicate whether their respective broadcast registers are empty or full via buses 322 to the decoders of each of the processors. Hence, storing a data word into broadcast register 260 sets or flips latch 321, via bus 324, to indicate to the decoder of each processor that information is.currently being held in broadcast register 260. In response, each decoder refrains from storing information to that broadcast register. In a similar manner, when information is retrieved from a broadcast register, thereby emptying that broadcast register, the respective latch is flipped or reset, via bus 326, to indicate to the decoders that this broadcast register is empty and ready to receive information. In response to the above, the decoders do not attempt to retrieve information from the empty broadcast register. By utilizing latches 320 and 321 in this manner and by arranging broadcast registers 250, 260 in this pipe or pipeline-like manner, information may be broadcast from one processor to the remaining processors in a FIFO manner.

In accordance with the principles of the present invention, and as will be discussed below, computing system 100 may operate in any of single instruction stream single data stream (SISD), single instruction stream multiple data stream (SIMD) or multiple instruction stream multiple data stream (MIMD) modes according to operation of and flow of information between processors 110. For instance, in SISD mode a single instruction, fetched by a local processor and broadcast to the other processors, is executed by all processors on a single piece of data, which is also fetched locally and broadcast to the other processors. In contrast, in SIMD mode a single instruction fetched by a local processor and broadcast to the other processors, is executed by each processor on its own local data fetched by itself. Finally, in MIMD mode, each of the processors fetches its own instruction and then executes this instruction on its own local data.

As will explained below with reference to FIG. 3, the operation of each of the processors 110 as well as the components associated therewith are controlled by inputs received from the instructions fetched from memory (i.e., the values of RB, RA and RT) and according to access control register 315. More specifically, a typical instruction fetched from memory includes a reference to a RB (and with some instructions, a reference to a RA) and a RT, and these references are used to set access control register 315. The particular bits in access control register 315, in turn, dictate whether data or instructions are to be retrieved locally or from a remote portion of memory, and whether data and instructions are to be transmitted for processing at another processor or are to be processed locally.

Access control register 315 is set on an instruction-by-instruction basis to control the use and updating of GPRs 210. In particular, access control register 315 includes two bits for each GPR except for a lone GPR (e.g., GPR 0) which instead is associated with a single bit of access control register 315. Similarly, instruction counter 244 is also associated with a single bit of access control register 315.

Figure 4A:
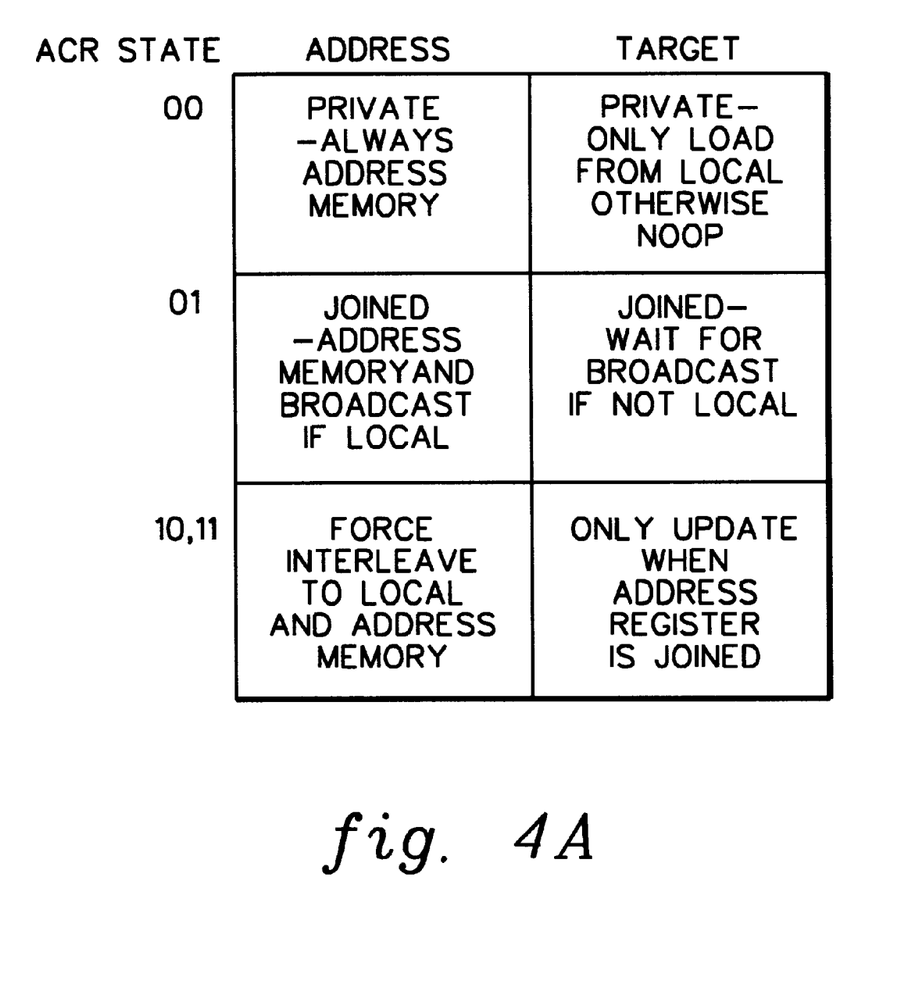
FIGS. 4A and 4B describe various operating states of general purpose registers of the processor of FIGS. 1 and 2, in accordance with the principles of the present invention.

In accordance with the principles of the present invention, operation of GPRs 210 are dictated by the values stored in access control register 315. For example, a 0 stored in the ACR bit associated with IC 244 indicates that the instruction streams are forked (i.e., each processor of the system fetches its own instruction stream). A 1 stored in the ACR bit associated with IC 244, on the other hand, indicates that the instruction streams are joined (i.e., a single processor fetches an instruction and broadcasts the instruction to the instruction units of the remaining processors). In a similar manner, referring to FIGS. 4a and 4b, the two bits of the ACR associated with GPRs 210 indicate that the registers are forked when set to 00, and joined when set to 01. Setting the high order bit of the ACR GPR bits to 1 can, in certain situations (i.e., when the IC register is joined or the ACR bit associated with the IC is set to 1) force an interleave to local memory.

As to the interleave scheme of the present invention, each L1 is local to a L2, which in turn is local to a memory. In operation, computing system 100 provides for L1 misses to access any L2 or any memory. However, even though L1 misses may access any L2 or any memory, accesses to a local L2 or local memory are faster and are therefore preferred. Division of memory in this manner is referred to as being interleaved.

When memory is interleaved, a subset of the memory address bits (e.g., the page bits of the address) are used to determine which memory is to be accessed. For example, the twelfth and the thirteenth bits from the right end of an address may be used as the interleave bits.

By forcing an interleave to local memory, each GPR fetches data from local memory. Specifically, an instruction, for example, a load forked address instruction (LFA), which is described below, inserts a local processor identifier (ID) into interleave bits of an address generated by each GPR. This forces each GPR to fetch from its own local memory. For instance, forcing interleave causes the interleave bits of addresses generated from GPRs belonging to processor 01 to be forced to 01. This causes the fetches of processor 01 to be made from its local memory, or in other words L2 cache 01. Thus when an interleave to memory is forced, processor 00 is forced to fetch from memory local to L2 cache 00, or interleave 00, and similarly, processor is forced to fetch from memory local to L2 cache 01, or interleave 01.

To further illustrate, when a GPR is joined and when the interleave bits of a memory address are 00, the processor having an ID of 00 will fetch from its local cache and from its local memory. The execution of a LFA RT, RB instruction sets the ACR bits of the RT to 10. Subsequently, when the RT is used as a RB, because its ACR bits were previously set to 10, the GPR will result in a forked fetch causing all processors to fetch their own data, and will also cause the address generator to force the generated address to be local. That is, the address generated by each processor will be forced to match a local memory interleave address. Subsequent forked fetches need not be local, but remote fetches will have longer miss times. Also, fetching from nonlocal memory in forked mode may cause contention for memory interfaces if the processors try to fetch from the same memory location. However, this allows the forked processors to act as a standard shared memory multiprocessor or SMP.

Figure 4B:
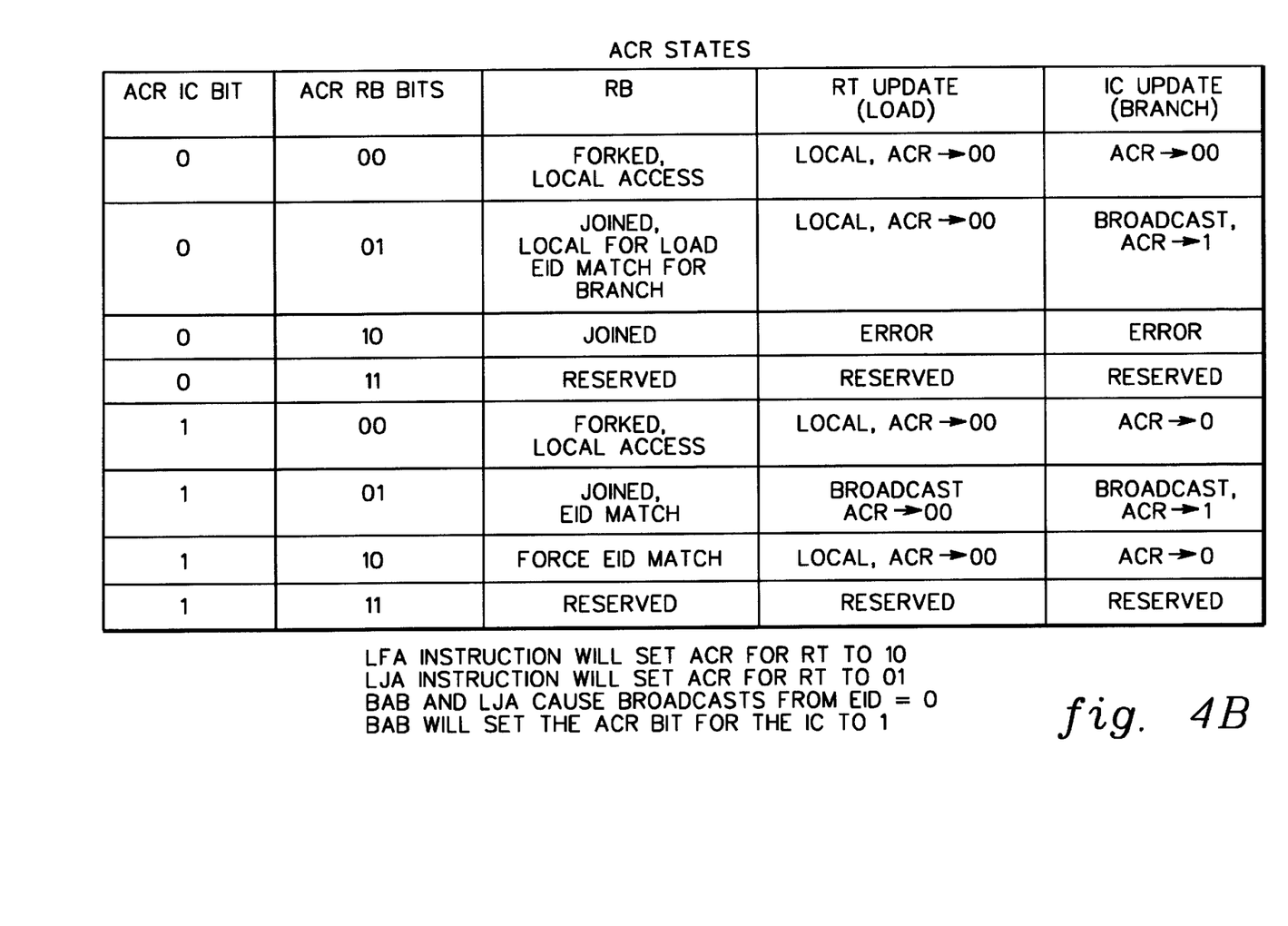

In accordance with the principles of the present invention, transition between the various states of operation occur in response to the particular instructions fetched from memory and in response to the settings of the bits in ACR 315. Referring to FIG. 4b, when the ACR IC bit is set to 0 (indicating that there are multiple instruction streams) and when the ACR bits for a particular GPR (ACR GPR) are set to 00 (indicating that the GPRs are forked), separate addresses are generated from the GPRs which, in turn, are used independently by each processor to access memory. Because each processor generates its own address, no broadcast occurs. After generating the addresses, the addresses are stored individually to the respective target registers. At that point, the ACR bits associated with the target registers are set to 00 indicating that the target registers are forked and that each processor has an independently loaded RT. Furthermore, if the instruction executed was a branch instruction, the ACR IC bit is updated to 0 indicating forked or multiple instruction streams.

When the ACR IC bit is set to 0 (indicating that there are multiple instruction streams) and when the ACR bits for a particular GPR are set to 01 (indicating that the GPRs are joined), a single address is generated from the GPRs. If the instruction is a load instruction, the address will be generated from local memory. If the instruction is a branch instruction, the instruction will indicate which processor is to generate the address according to a processor ID contained in the instruction. This address is then broadcast to the remaining processors. Subsequently, the bits associated with the target registers are set to 00 indicating that the target registers are forked. Furthermore, if the instruction executed was a branch instruction, the ACR IC bit is updated to 1 indicating a joined or single instruction stream requiring the results to be broadcast.

When the ACR IC bit is set to 1 (indicating that there is a single instruction stream) and when the ACR bits for a particular GPR are set to 00 (indicating that the GPRs are forked), separate addresses are generated from the GPRs which are, in turn, used independently by each processor to access memory. Because each processor generates its own address, no broadcast occurs. After generating the addresses, the addresses are stored individually to the respective target registers. At that point, the ACR bits associated with the target registers are set to 00 indicating that the target registers are forked. Furthermore, if the instruction executed was a branch instruction, the ACR IC bit is updated to 0 indicating forked or multiple instruction streams.

When the ACR IC bit is set to 1 (indicating a single instruction stream) and when the ACR bits for a particular GPR (ACR GPR) are set to 01 (indicating that the GPRs are joined), a single address is generated from the GPRs. In this case, since the address registers are joined, a processor indicated by the instruction via a processor ID match will generate the address. The resulting address is then broadcast to the other processors. Subsequently, the ACR bits associated with the target registers are set to 01 indicating that the target registers are joined. Furthermore, if the instruction executed was a branch instruction, the ACR IC bit will be updated to 1 indicating that there is a single instruction stream requiring the results to be broadcast.

When the ACR IC bit is set to 1 (indicating a single instruction stream) and when the ACR bits for a particular GPR are set to 10 (indicating the forcing of an interleave to local memory), each processor generates its own address, with the address generated being forced to local memory according to the interleave scheme described above (i.e., processor 01 is forced to interleave 01; processor 10 is forced to interleave 10; etc.). By doing so, a SISD program with joined GPRs can be forked to start operation in a SIMD mode. Subsequently, the ACR bits associated the target registers are set to 00 indicating that they are forked. Further, if the instruction executed is a branch instruction, the ACR IC bit is updated to 0.

Next, it should be noted that certain states are either reserved or result in errors and, consequently, are not further discussed. These include the following: 1) ACR IC=0, ACR RB=01; 2) ACR IC=0, ACR RB=11; and 3) ACR IC=1, ACR RB=11.

In accordance with the principles of the present invention, a Load Forked Address (LFA) instruction causes data to be fetched locally and then subsequently broadcast. In particular, the interleave bits contained in the instruction are used to determine which processor fetches. In this regard, the processor local to the memory indicated by the interleave bits fetches and broadcasts to the remaining processors. After broadcast, the ACR bits for the target registers are set to 10. As discussed above, subsequent use of a register having ACR bits associated therewith set to 10 causes a transition from SISD mode to SIMD mode.

A Load Joined Address (LJA) instruction, in contrast to the LFA instruction, causes a GPR's ACR bits to be set to 01. When the LJA instruction is executed, data is fetched locally and broadcast by processor 00. Then, the ACR for the target GPR is set to 01. Subsequent use of that register as an address register results in a fetch and broadcast by the processor local to the address loaded. In this manner, operation in SIMD mode with forked GPRs is shifted to SISD mode with joined GPRs.

A branch at barrier instruction synchronizes the individual processors. More particularly, this instruction causes individually executing processors to temporarily cease processing, at a barrier, and subsequently wait for the remaining processors to also arrive at that barrier. Furthermore, the processors at the barrier are allowed to wait only a limited amount of time (i.e., a timeout period) for the other processors. At the end of the timeout period, assuming that at least one processor has not arrived at the barrier, an error is generated. On the other hand, assuming that all of the processors arrive at the barrier before the timeout, the instruction streams are joined by setting the ACR bit of the IC to 1. In this manner, operation of the system may be switched from multiple instruction streams to a single instruction stream.

Another process for joining instruction streams includes executing a branch instruction with joined base registers. This technique is described in greater detail below, with reference to FIG. 6.

Figure 5:
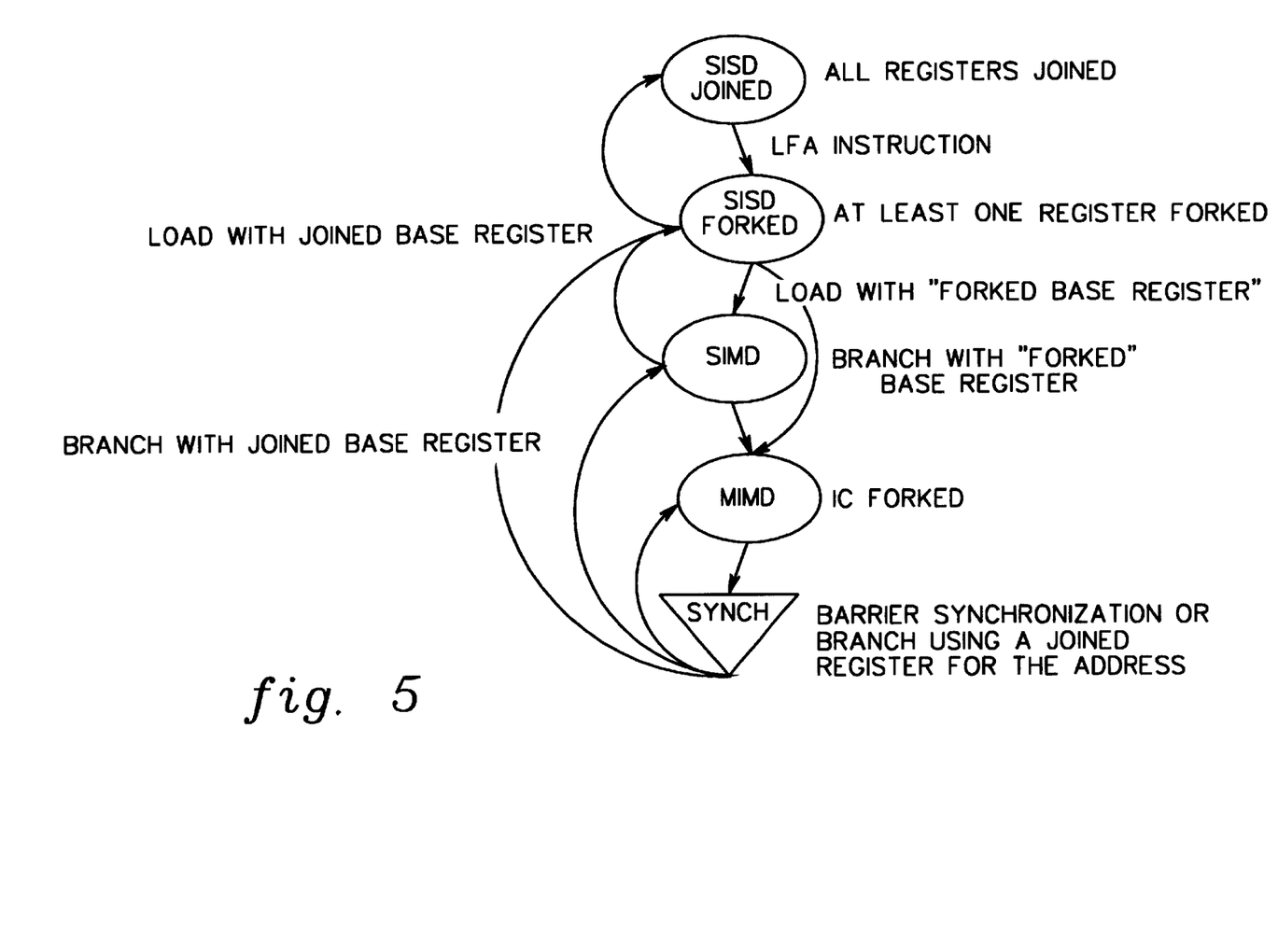
FIG. 5 describes various operating states of the computing system of FIG. 1, in accordance with the principles of the present invention.

Referring to FIG. 5, the various machine states (i.e., SISD, SIMD and MIMD modes) and their relation to one another are described. In the SISD joined mode, computing system 100 operates in the uniprocessor mode. In this mode, each GPR in a processor is joined with its corresponding GPR in the remaining processors. In operation, a single instruction stream is executed by the processors. Specifically, a processor local to the instruction stream and data stream fetches from memory and executes the instruction. Thus, the addresses of the instruction and of the data dictate which processor accesses memory. When the addresses shift out of range of a particular processor, a different processor commences operation. As a result, a single processor in the system operates at any given time.

Transition may be made from SISD joined mode to SISD forked mode by execution of the Load Forked Address instruction. As discussed above, this instruction forks the joined registers by setting the ACR bits associated with a GPR to 10. After forking, the GPRs act independently and generate addresses according to the interleave scheme of the present invention.

Operation of the system shifts or transitions from SISD mode to SIMD mode by actually using a forked register. For instance, loading a register forked by the LFA instruction, as discussed above, causes each processor to fetch data independently. In SIMD mode a single instruction stream is executed by the processors (i.e., an instruction is fetched by a local processor and broadcast to the other processors) using data fetched by each processor from its own local portion of memory. Thus, each processor receives the same instruction, but operates on different data elements.

To return to SISD mode from SIMD mode, a LJA instruction may be performed. With this instruction, processor 00 performs a fetch and broadcasts to the remaining processors. The other processors store the broadcast data into their target register, thereby joining these registers. Additionally, the ACR bits associated with this GPR are also set to 01 indicating a joined state.

While operating in SIMD or SISD forked mode, executing a branch instruction with a forked RB splits the processors. This switches operation into MIMD mode and allows each processor to execute its own instruction stream using data fetched independently. In MIMD mode, each of the processors fetches its own instruction and then executes this instruction on its own local data. Hence, each processor is independent and operates on its own instructions and on its own data.

Figure 6:
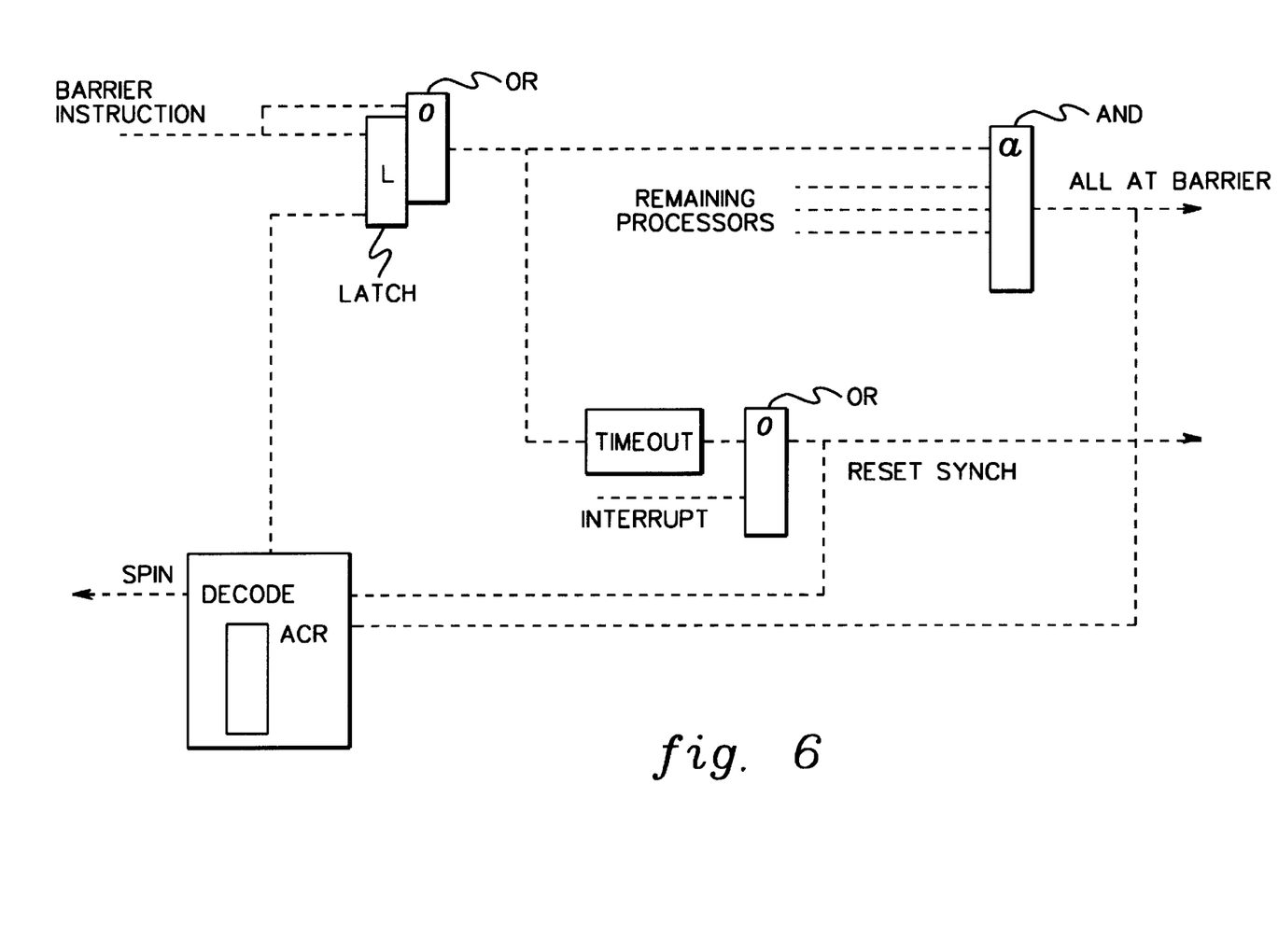
FIG. 6 depicts one example of a portion of the computing system of FIG. 1 utilized for implementing a barrier synchronization, in accordance with the principles of the present invention.

To exit MIMD mode a barrier synchronization using the branch at barrier instruction is performed. Referring to FIG. 6, a barrier instruction is read resulting in a barrier synchronization. The processor receiving the instruction spins, or pauses and refrains from processing, until a result or update regarding the other processors is received. The result will be, for example, −1 if a timeout or an interrupt occurs before all engines reach the barrier. A zero, for example, is returned if all engines reach the barrier within the timeout. At this point, the ACR bit of the IC is set to 1 indicating a single instruction stream.

Figure 7A:
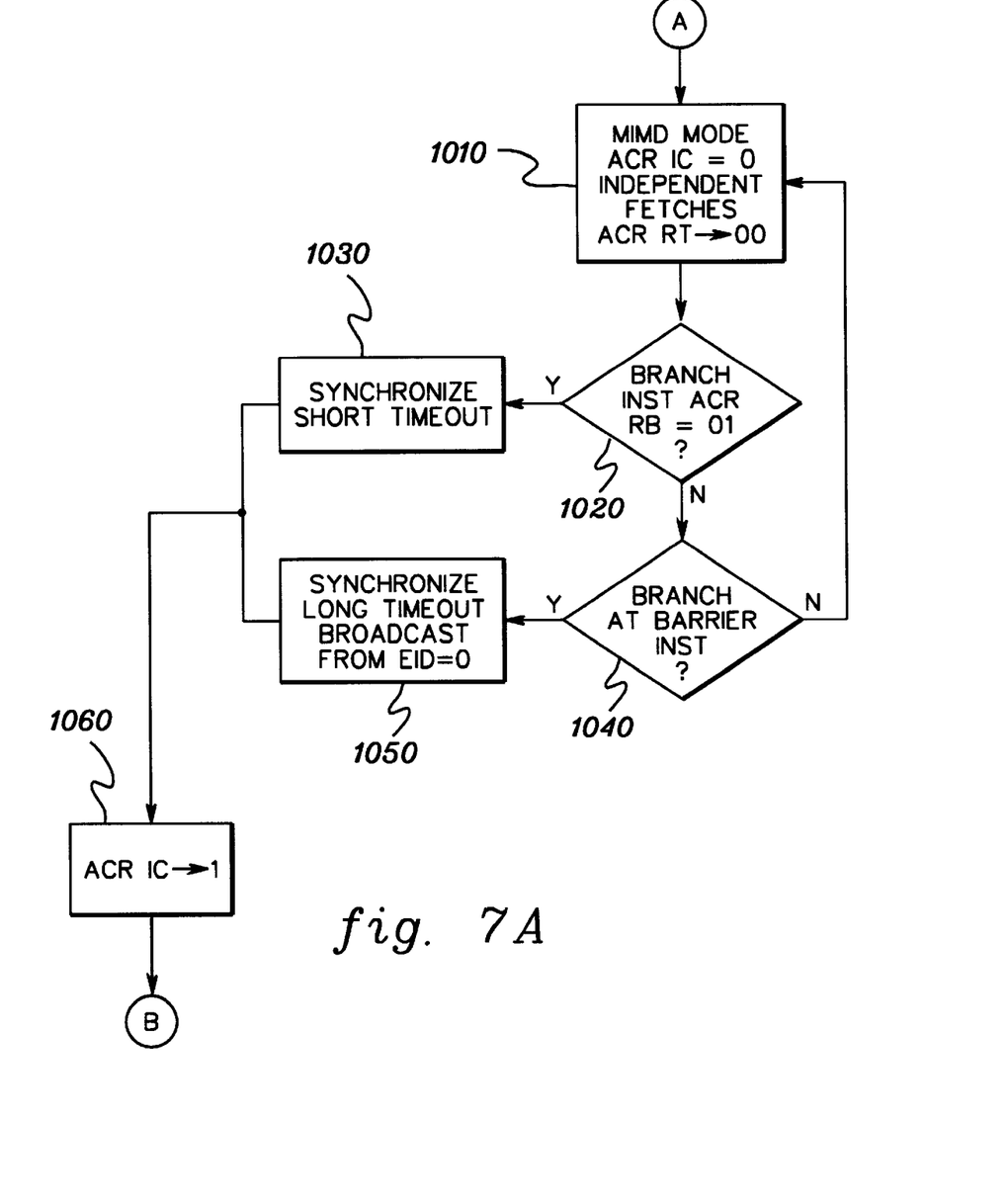
FIGS. 7A and 7B depict one example of logic utilized by the computing system of FIG. 1 for switching between uniprocessor mode and parallel processing mode.
Figure 7B:
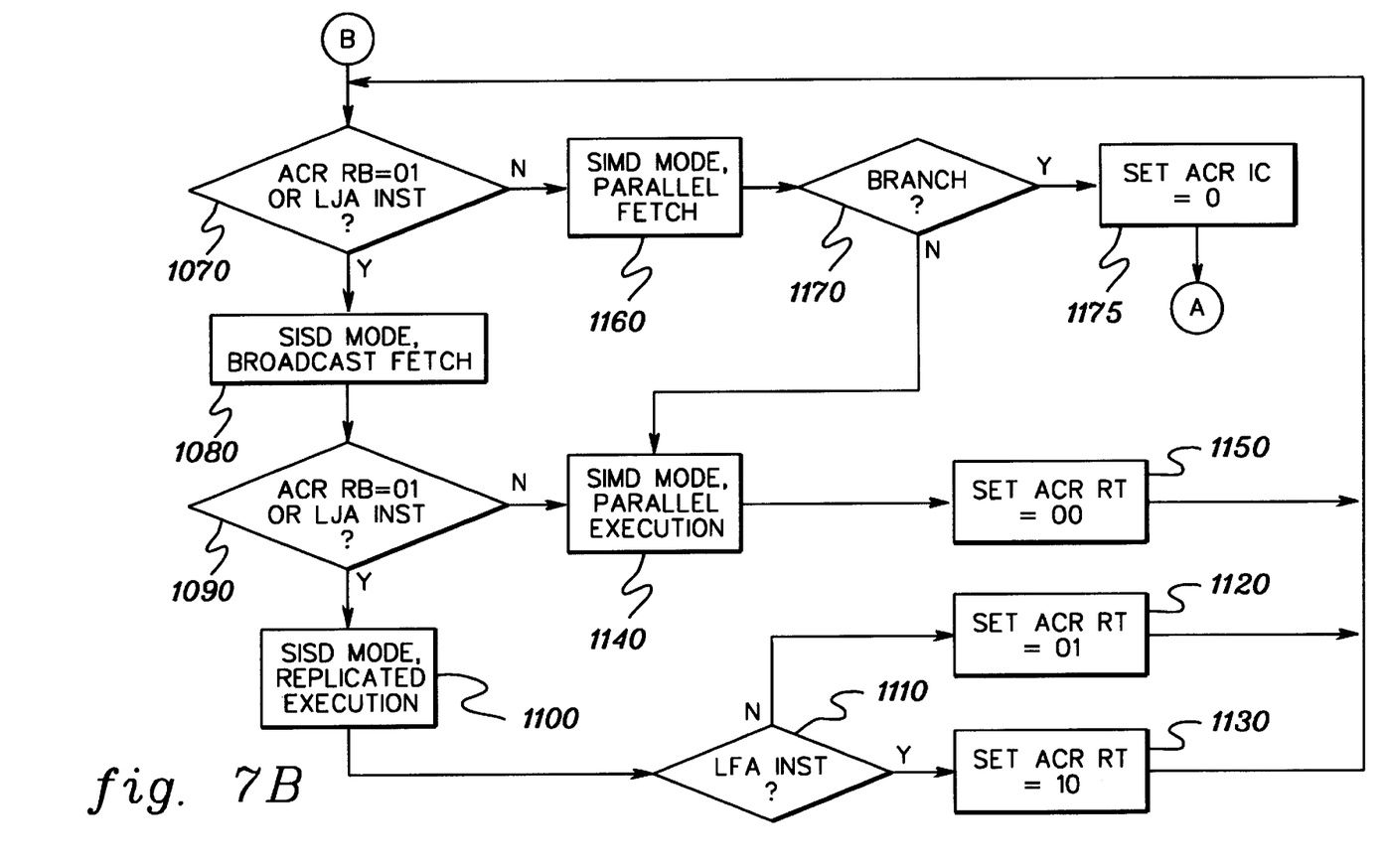

Operation of computing system 100 is now discussed in detail with reference to FIG. 7. Typically speaking, computing system 100 commences operation in MIMD mode 1010. During MIMD mode, the ACR IC bit is set to 0 and the ACR RT bits are set to 00. As a result, each processor operates independently by fetching its own instructions and by executing these instructions on locally fetched data.

During execution in this mode, operation can be shifted from MIMD mode by performing a synchronization or, in other words, by synchronizing operation of the individual processors. In this regard, two circumstances typically cause synchronization. First, a branch instruction 1020 executed on a joined GPR (i.e., ACR bits set to 01) can cause synchronization 1030. In this case, a relatively short timeout is provided for synchronization before returning an error.

In the alternative, a branch at barrier instruction 1040, can also result in synchronization via a broadcast from engine 0, 1050. As discussed above, this instruction allows for a longer timeout period for the processors to synchronize. When synchronized, an arbitrary processor, in this instance engine 00 fetches an instruction and broadcasts to the remaining processors, hence joining the instruction stream.

In the absence of a synchronization event from, for example, the branch instruction performed with a joined GPR or the branch at barrier instruction, processing continues in MIMD mode 1010.

If synchronization is effected, the ACR bit of the IC is set to 1 thereby joining the instruction streams 1060. At that point, processing continues in either SIMD mode or SISD mode according to the state of the RB or according to whether a LJA instruction is fetched 1070. More specifically, if either a LJA instruction is fetched or a joined GPR (ACR bits set to 01) is utilized, processing continues in SISD mode 1080.

In SISD mode 1080, a single instruction is fetched and executed. Similarly, a single data stream is executed by the processors. Thus, as described above, a processor local to the instruction stream and to the data stream fetches from memory and executes the instruction as dictated by the interleave scheme of the present invention.

Subsequently at step 1090, whether the ACR bits associated with a RA are set to 01, indicating that it is joined, and whether a LJA instruction is fetched dictate whether processing continues in SISD mode with replicated execution 1100 or SIMD mode with parallel execution 1140. In particular, when a RA is joined or when a LJA instruction is executed, processing continues in SISD mode with replicated execution 1100, or, that is, operation in a uniprocessor mode with each processor performing the same operation and storing the same result in RT. In contrast, when an instruction other than a LJA instruction is executed processing in SIMD mode with parallel execution commences 1140.

From SISD mode with replicated execution 1100, operation may remain in SISD mode if an instruction fetched is not a LFA instruction 1110. In particular, if a fetched instruction is not a LFA instruction, the ACR associated with the RT is set to 01, at 1120, in which case the GPR is joined and in which case processing continues in SISD mode.

If, on the other hand, a LFA instruction is fetched, the ACR associated with the RT is set to 10, at 1130. In this case, the next use of this GPR will result in a SIMD operation which would then cause additional GPRs to fork or split instruction into multiple instruction streams causing a transition to MIMD mode.

On the other hand, at step 1090, if a LJA instruction is not fetched and if a RA that is not joined is utilized (i.e., as dictated by having its ACR bits set to 10 or 00), instead of processing in SISD mode 1100, processing continues in SIMD mode with parallel execution 1140. In this case, the ACR bits associated with the RT are set to 00, at 1150, indicating that RT is now forked containing different data fetched or generated independently by each processor.

Returning to step 1070, if the GPRs used to generate an address are not joined (i.e., if the ACR bits associated with this RB are set to something other than 01) or if some instruction other than a LJA instruction is fetched, instead of entering SISD mode, processing will continue in SIMD mode with parallel fetches 1160. In this case, each processor fetches its own data.

From SIMD mode with parallel fetches 1160, a branch instruction, at 1170, forks the instruction stream, and indication of such is made by setting the ACR bit of the IC to 0, at 1180. By forking the instruction stream, processing subsequently returns to MIMD mode 1010.

If an instruction other than a branch instruction is fetched, at 1170, processing continues in SIMD mode 1140 with parallel execution, as discussed above.

Described above are techniques and mechanisms for operating a computing system by relying on joining and forking registers. More specifically, when joined, the registers contain a same piece of information. In contrast, when forked, the registers contain different pieces of information. By allowing the registers to switch from joined to forked modes, the computing system may rapidly and efficiently switch between multiple modes of operation. Furthermore, the present invention also provides for a higher memory bandwidth and a larger, faster cache through the partitioning of memory and through the fetching and broadcasting of information by a processor local to a particular memory section.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of operating a computing system, wherein said computing system comprises a plurality of processors with each processor having at least one instruction register, said method comprising:

operating said plurality of processors in a multiple instruction mode (forked mode), wherein said instruction registers generate separate instruction streams;

joining said instruction registers to switch operation of said plurality of processors to a single instruction mode (joined mode), wherein said instruction registers generate a single instruction stream; and wherein each processor of said plurality of processors further includes at least one general purpose register which may be forked or joined, wherein when forked said general purpose registers generate separate data streams and contain a different piece of information, and wherein when joined said general purpose registers generate a single data stream and contain a same piece of information.

2. The method of claim 1, wherein said joining comprises executing a barrier synchronization.

3. The method of claim 1, wherein said joining comprises broadcasting an instruction from one processor to the remaining processors of said plurality of processors.

4. The method of 1, wherein each processor of said plurality of processors further includes a control register which dictates whether the at least one general purpose register and the at least one instruction register of its processor are forked or joined.

5. The method of claim 1, wherein said joining said instruction registers comprises executing a branch instruction with joined general purpose registers.

6. The method of claim 1, further comprising forking said joined instruction registers to switch operation of said plurality of processors to said multiple instruction mode.

7. The method of claim 6, wherein said forking comprises executing a branch instruction which fetches an instruction using an address generated from a forked general purpose register.

8. The method of claim 1, wherein said computing system further comprises a memory, wherein said memory is partitioned into a plurality of memory units with each memory unit being local to one processor and being remote to the remaining processors.

9. The method of claim 1, wherein said computing system further comprises a plurality of memory units, each memory unit being local to one processor and being remote to the remaining processors, said method further comprising fetching, when in said single instruction mode, an instruction stored in a memory unit by one processor which is local to said memory unit and broadcasting said instruction to said remaining processors which are not local to said memory unit; and fetching and not broadcasting, when in said multiple instruction mode, an instruction by each processor from its local memory unit.

10. The method of claim 1, wherein, when joined, each instruction register contains a same instruction, and wherein, when forked, each instruction register contains a different instruction.

11. The method of claim 1, wherein operation of said plurality of processors switches from said multiple instruction mode to said single instruction mode on an instruction-by-instruction basis.

12. The method of claim 1, wherein each processor further comprises a control register which dictates whether said instruction register is forked or joined.

13. A method of operating a computing system, wherein said computing system comprises a plurality of processors with each processor having at least one general purpose register, said method comprising:

operating said plurality of processors in a multiple data mode, wherein said general purpose registers generate separate data streams; and joining said registers to switch operation of said plurality of processors to a single data mode, wherein said general purpose registers together generate a single data stream.

14. The method of claim 13, wherein said joining comprises loading data from an address generated from a joined general purpose register.

15. The method of claim 13, wherein said joining comprises loading data from an operation having operands which are fetched from a joined general purpose register.

16. The method of claim 13, wherein said joining comprises executing a joined address instruction by one processor of said plurality of processors and broadcasting data by said one processor to the remaining processors regardless of whether said general purpose registers are forked or joined.

17. The method of claim 13, further comprising forking said joined general purpose registers to switch operation of said plurality of processors to said multiple data mode.

18. The method of claim 17, wherein said forking comprises executing a load forked address instruction with forked general purpose registers.

19. The method of claim 13, further comprising forcing interleave by inserting a processor identifier into addresses generated from said general purpose registers, wherein forcing interleave causes each general purpose register to generate a data stream from a local memory.

20. The method of claim 13, wherein said computing system further comprises a memory, wherein said memory is partitioned into a plurality of memory units with each memory unit being local to one processor and being remote to the remaining processors.

21. The method of claim 13, wherein said computing system further comprises a plurality of memory units, each memory unit being local to one processor and being remote to the remaining processors, said method further comprising fetching, when in said single data mode, a piece of data stored in a memory unit by one processor which is local to said memory unit and broadcasting said piece of data to said remaining processors which are not local to said memory unit; and fetching and not broadcasting, when in said multiple data mode, a piece of data by each processor from its local memory.

22. The method of claim 13, wherein, when joined, each general purpose register contains a same piece of data, and wherein, when forked, each general purpose register contains a different piece of data.

23. The method of claim 13, wherein operation of said plurality of processors switches from said multiple data mode to said single data mode on an instruction-by-instruction basis.

24. The method of claim 13, wherein each processor further comprises a control register which dictates whether the at least one general purpose register of its processor is forked or joined.

25. A system for operating a computing system, wherein said computing system comprises a plurality of processors with each processor having at least one instruction register, said system comprising:

means for operating said plurality of processors in a multiple instruction mode (forked mode), wherein said instruction registers generate separate instruction streams;

means for joining said instruction registers to switch operation of said plurality of processors to a single instruction mode Coined mode), wherein said instruction registers generate a single instruction stream; and wherein each processor of said plurality of processors further includes at least one general purpose register which may be forked or joined, wherein when forked said general purpose registers generate separate data streams and contain a different piece of information, and wherein when joined said general purpose registers generate a single data stream and contain a same piece of information.

26. The system of claim 25, wherein said means for joining comprises means for executing a barrier synchronization.

27. The system of claim 25, wherein said means for joining comprises means for broadcasting an instruction from one processor to the remaining processors of said plurality of processors.

28. The system of 25, wherein each processor of said plurality of processors further includes a control register which dictates whether the at least one general purpose register and the at least one instruction register of its processor are forked or joined.

29. The system of claim 25, wherein said means for joining said instruction registers comprises means for executing a branch instruction with joined general purpose registers.

30. The system of claim 25, further comprising means for forking said joined instruction registers to switch operation of said plurality of processors to said multiple instruction mode.

31. The system of claim 30, wherein said means for forking comprises means for executing a branch instruction which fetches an instruction using an address generated from a forked general purpose register.

32. The system of claim 25, wherein said computing system further comprises a memory, wherein said memory is partitioned into a plurality of memory units with each memory unit being local to one processor and being remote to the remaining processors.

33. The system of claim 25, wherein said computing system further comprises a plurality of memory units, each memory unit being local to one processor and being remote to the remaining processors, said system further comprising means for fetching, when in said single instruction mode, an instruction stored in a memory unit by one processor which is local to said memory unit and means for broadcasting said instruction to said remaining processors which are not local to said memory unit; and means for fetching and not broadcasting, when in said multiple instruction mode, an instruction by each processor from its local memory unit.

34. The system of claim 25, wherein, when joined, each instruction register contains a same instruction, and wherein, when forked, each instruction register contains a different instruction.

35. The system of claim 25, wherein operation of said plurality of processors switches from said multiple instruction mode to said single instruction mode on an instruction-by-instruction basis.

36. The system of claim 25, wherein each processor further comprises a control register which dictates whether said instruction register is forked or joined.

37. A system of operating a computing system, wherein said computing system comprises a plurality of processors with each processor having at least one general purpose register, said system comprising:

means for operating said plurality of processors in a multiple data mode, wherein said general purpose registers generate separate data streams; and means for joining said registers to switch operation of said plurality of processors to a single data mode, wherein said general purpose registers together generate a single data stream.

38. The system of claim 37, wherein said means for joining comprises means for loading data from an address generated from a joined general purpose register.

39. The system of claim 37, wherein said means for joining comprises means for loading data from an operation having operands which are fetched from a joined general purpose register.

40. The system of claim 37, wherein said means for joining comprises means for executing a joined address instruction by one processor of said plurality of processors and means for broadcasting data by said one processor to the remaining processors regardless of whether said general purpose registers are forked or joined.

41. The system of claim 37, further comprising means for forking said joined general purpose registers to switch operation of said plurality of processors to said multiple data mode.

42. The system of claim 41, wherein said means for forking comprises means for executing a load forked address instruction with forked general purpose registers.

43. The system of claim 37, further comprising means for forcing interleave by inserting a processor identifier into addresses generated from said general purpose registers, wherein forcing interleave causes each general purpose register to generate a data stream from a local memory.

44. The system of claim 37, wherein said computing system further comprises a memory, wherein said memory is partitioned into a plurality of memory units with each memory unit being local to one processor and being remote to the remaining processors.

45. The system of claim 37, wherein said computing system further comprises a plurality of memory units, each memory unit being local to one processor and being remote to the remaining processors, said system means further comprising means for fetching, when in said single data mode, a piece of data stored in a memory unit by one processor which is local to said memory unit and means for broadcasting said piece of data to said remaining processors which are not local to said memory unit; and means for fetching and not broadcasting, when in said multiple data mode, a piece of data by each processor from its local memory.

46. The system of claim 37, wherein, when joined, each general purpose register contains a same piece of data, and wherein, when forked, each general purpose register contains a different piece of data.

47. The system of claim 37, wherein operation of said plurality of processors switches from said multiple data mode to said single data mode on an instruction-by-instruction basis.

48. The system of claim 37, wherein each processor further comprises a control register which dictates whether the at least one general purpose register of its processor is forked or joined.

49. A system for operating a computing system, wherein said computing system comprises a plurality of processors with each processor having at least one instruction register, said system comprising:
 a computing node capable of operating said plurality of processors in a multiple instruction mode (forked mode), wherein said instruction registers generate separate instruction streams; said computing node further being capable of joining said instruction registers to switch operation of said plurality of processors to a single instruction mode (joined mode), wherein said instruction registers generate a single instruction stream, wherein each processor of said plurality of processors includes at least one general purpose register which may be forked or joined, wherein when forked said general purpose registers generate separate data streams and contain a separate piece of information, and when joined said general purpose registers generate a single data stream and contain a same piece of information.

50. A system for operating a computing system, wherein said computing system comprises a plurality of processors with each processor having at least one general purpose register, said system comprising:
 a computing node capable of operating said plurality of processors in a multiple data mode, wherein said general purpose registers generate separate data streams; said computing node further being capable of joining said registers to switch operation of said plurality of processors to a single data mode, wherein said general purpose registers together generate a single data stream.

51. An article of manufacture comprising:
 a computer useable medium having computer readable program code means embodied therein for operating a computing system, wherein said computing system comprises a plurality of processors with each processor having at least one instruction register, the computer readable program code means in said article of manufacture comprising:
 computer readable program code means for operating said plurality of processors in a multiple instruction mode (forked mode), wherein said instruction registers generate separate instruction streams; and
 computer readable program code means for joining said instruction registers to switch operation of said plurality of processors to a single instruction mode (joined mode), wherein said instruction registers generate a single instruction stream; and
 wherein each processor of said plurality of processors further includes at least one general purpose register which may be forked or joined, wherein when forked said general purpose registers generate separate data streams and contain a different piece of information, and wherein when joined said general purpose registers generate a single data stream and contain a same piece of information.

52. The article of manufacture of claim 51, wherein said computer readable program code means for joining comprises computer readable program code means for executing a barrier synchronization.

53. The article of manufacture of claim 51, wherein said computer readable program code means for joining comprises computer readable program code means for broadcasting an instruction from one processor to the remaining processors of said plurality of processors.

54. The article of manufacture of claim 51, wherein each processor of said plurality of processors further includes a control register which dictates whether the at least one general purpose register and the at least one instruction register of its processor are forked or joined.

55. The article of manufacture of claim 51, wherein said joining said instruction registers comprises executing a branch instruction with joined general purpose registers.

56. The article of manufacture of claim 51, further comprising computer readable program code means for forking said joined instruction registers to switch operation of said plurality of processors to said multiple instruction mode.

57. The article of manufacture of claim 56, wherein said computer readable program code means for forking comprises computer readable program code means for executing a branch instruction which fetches an instruction using an address generated from a forked general purpose register.

58. The article of manufacture of claim 51, wherein said computing system further comprises a memory, wherein said memory is partitioned into a plurality of memory units with each memory unit being local to one processor and being remote to the remaining processors.

59. The article of manufacture of claim 51, wherein said computing system further comprises a plurality of memory units, each memory unit being local to one processor and being remote to the remaining processors, said computer readable program code means in said article of manufacture further comprising computer readable program code means for fetching, when in said single instruction mode, an instruction stored in a memory unit by one processor which is local to said memory unit and computer readable program code means for broadcasting said instruction to said remaining processors which are not local to said memory unit; and computer readable program code means for fetching and not broadcasting, when in said multiple instruction mode, an instruction by each processor from its local memory unit.

60. The article of manufacture of claim 51, wherein, when joined, each instruction register contains a same instruction, and wherein, when forked, each instruction register contains a different instruction.

61. The article of manufacture of claim 51, wherein operation of said plurality of processors switches from said multiple instruction mode to said single instruction mode on an instruction-by-instruction basis.

62. The article of manufacture of claim 51, wherein each processor further comprises a control register which dictates whether said instruction register is forked or joined.

63. An article of manufacture comprising a computer readable program code means embodied therein for operating a computing system, wherein said computing system comprises a plurality of processors with each processor having at least one general purpose register, the computer readable program code means in said article of manufacture comprising:

computer readable program code means for operating said plurality of processors in a multiple data mode, wherein said general purpose registers generate separate data streams; and computer readable program code means for joining said registers to switch operation of said plurality of processors to a single data mode, wherein said general purpose registers together generate a single data stream.

64. The article of manufacture of claim 63, wherein said computer readable program code means for joining comprises computer readable program code means for loading data from an address generated from a joined general purpose register.

65. The article of manufacture of claim 63, wherein said computer readable program code means for joining comprises computer readable program code means for loading data from an operation having operands which are fetched from a joined general purpose register.

66. The article of manufacture of claim 63, wherein said computer readable program code means for joining comprises computer readable program code means for executing a joined address instruction by one processor of said plurality of processors and computer readable program code means for broadcasting data by said one processor to the remaining processors regardless of whether said general purpose registers are forked or joined.

67. The article of manufacture of claim 63, further comprising computer readable program code means for forking said joined general purpose registers to switch operation of said plurality of processors to said multiple data mode.

68. The article of manufacture of claim 67, wherein said computer readable program code means for forking comprises computer readable program code means for executing a load forked address instruction with forked general purpose registers.

69. The article of manufacture of claim 63, further comprising computer readable program code means for forcing interleave by inserting a processor identifier into addresses generated from said general purpose registers, wherein forcing interleave causes each general purpose register to generate a data stream from a local memory.

70. The article of manufacture of claim 63, wherein said computing system further comprises a memory, wherein said memory is partitioned into a plurality of memory units with each memory unit being local to one processor and being remote to the remaining processors.

71. The article of manufacture of claim 63, wherein said computing system further comprises a plurality of memory units, each memory unit being local to one processor and being remote to the remaining processors; said computer readable program code means in said article of manufacture further comprising computer readable program code means for fetching, when in said single data mode, a piece of data stored in a memory unit by one processor which is local to said memory unit and computer readable program code means for broadcasting said piece of data to said remaining processors which are not local to said memory unit; and computer readable program code means for fetching and not broadcasting, when in said multiple data mode, a piece of data by each processor from its local memory.

72. The article of manufacture of claim 63, wherein, when joined, each general purpose register contains a same piece of data, and wherein, when forked, each general purpose register contains a different piece of data.

73. The article of manufacture of claim 63, wherein operation of said plurality of processors switches from said multiple data mode to said single data mode on an instruction-by-instruction basis.

74. The article of manufacture of claim 63, wherein each processor further comprises a control register which dictates whether the at least one general purpose register of its processor is forked or joined.

* * * * *

UNITED STATES PATENT AND TRADEMARK OFFICE
CERTIFICATE OF CORRECTION

PATENT NO. : 6,766,437 B1
DATED : July 20, 2004
INVENTOR(S) : Coscarella et al.

It is certified that error appears in the above-identified patent and that said Letters Patent is hereby corrected as shown below:

Column 13,
Line 55, delete the words "Coined mode)" and insert -- (joined mode) --

Signed and Sealed this

Fourteenth Day of September, 2004

JON W. DUDAS
*Director of the United States Patent and Trademark Office*